Patented Aug. 12, 1941

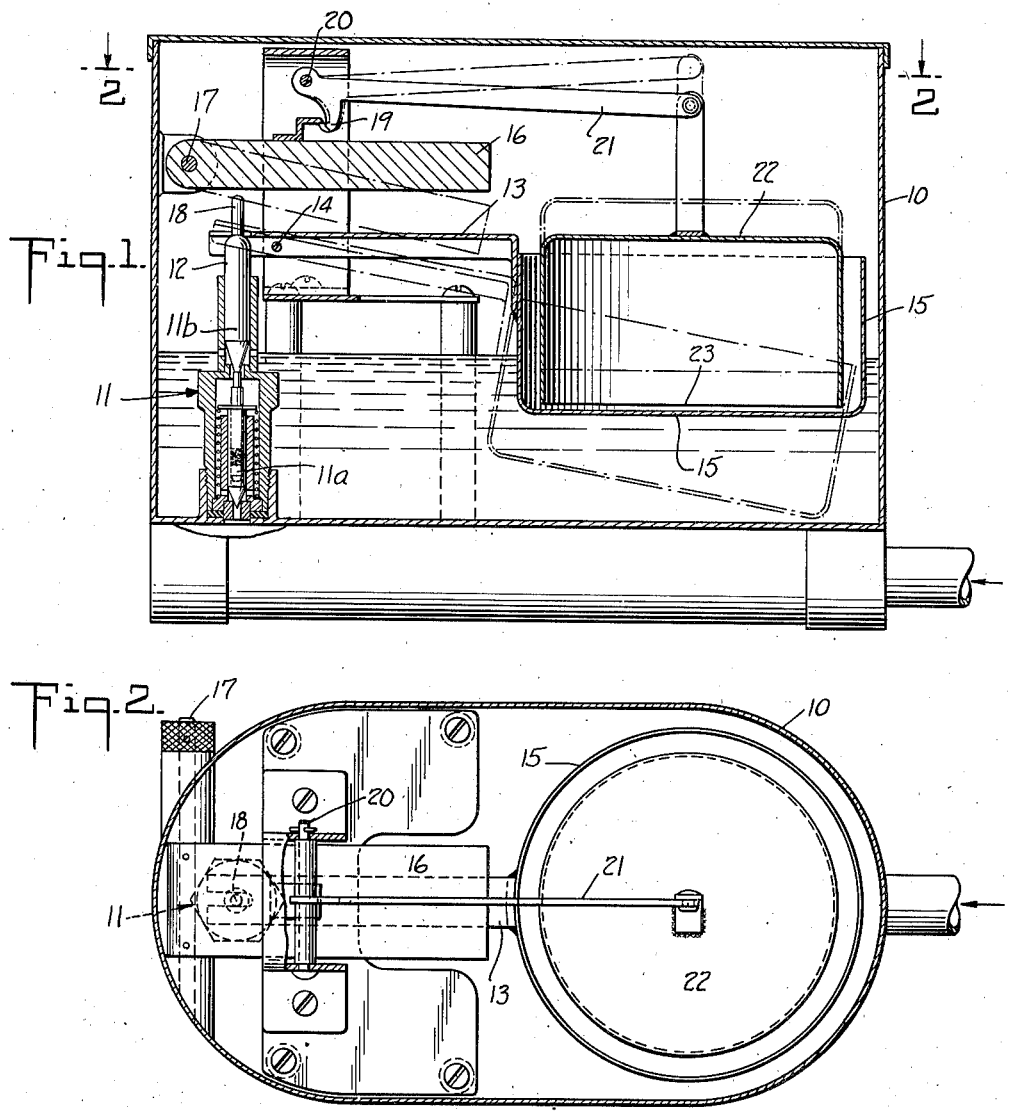

2,252,459

UNITED STATES PATENT OFFICE 2,252,459

LIQUID CONTROL VALVE

Ralph W. De Lancey, Meriden, Conn., assignor to The Miller Company, Meriden, Conn., a corporation of Connecticut Application October 5, 1940, Serial No. 359,872

4 Claims. (Cl. 137—68)

The present invention relates to liquid control valves, and is more particularly directed toward liquid control valves for controlling the flow of fuel to oil burners.

It is customary to provide a constant level valve to control the flow of fuel to oil burners, this valve maintaining a constant level of fuel in a reservoir. Inasmuch as it is possible that the control valve may fail to function and permit continued leakage into the reservoir it is necessary to provide a supplemental safety feature whereby the valve mechanism may be more securely closed in response to the continued leakage of the valve.

The present invention contemplates improvements in safety mechanisms for this purpose, and according to the present invention the float which normally operates to control the opening and closing of the valve responsive to liquid level is open at the top so that in the event of continued leakage fuel may overflow into the float. This float receives a second liquid level responsive element normally held at a predetermined level so as not to interfere with the normal operation of the primary control mechanism. This second liquid level control mechanism normally holds up a weighted member and acts upon the flowing of oil into the first float to release the weighted member so that it can drop and engage the valve mechanism to force it to closed position.

The accompanying drawing shows for purposes of illustrating the present invention, one of the many embodiments in which the invention may take form, it being understood that the drawing is illustrative of the invention rather than limiting the same.

In the drawing:

Figure 1 is a vertical sectional view through a constant level valve having the safety feature above referred to; and Figure 2 is a sectional view taken on the line 2—2 of Figure 1.

In the drawing a reservoir is indicated at 10. It has an inlet valve mechanism designated generally at 11 and provided with a lower normally open service valve 11a and an upper normally open emergency valve 11b. Each of these valves is operated in sequence by the downward movement of a valve stem 12, as shown and described in my application Serial No. 349,844, filed August 2, 1940. A simple needle valve may be substituted.

The plunger 12 is normally moved downwardly by a lever 13 pivoted at 14 and connected to a float member 15. This float member is, as indicated in the drawing, in the form of an open metal cup. The parts are adjusted so that the upper edge of the float 15 is well above the normal level of liquid in the reservoir.

A weight 16 is pivoted at 17 adjacent the extension 18 on the valve stem 12. This weight is held up by a latch element 19 pivoted at 20 and carrying an arm 21 from which hangs a dome shaped liquid level responsive member or float 22. The lower edge 23 of the member 22 is normally just above the bottom of the float 15 when the float is in its upper position.

Should the oil continue to leak into the reservoir an amount to raise the level up to the top of the float 15, it will then flow over into this float. Only a very small amount of oil will be necessary to close the seal across the bottom of the float 22 so that the air in it is trapped. Then on continued leakage only a small amount of oil necessary to fill the space between the floats will be necessary to materially increase the buoyancy of the dome shaped member 22. This member 22 will therefore tend to rise and this will disconnect the latch element 19 permitting the weight 16 to drop on to the top of the valve stem thereby forcing the valve stem to closed position and effectively stopping the flow of fuel.

The device will operate in the same manner should the float 15 leak so that the fuel flows into the inside of the float.

It is obvious that the invention may be embodied in many forms and constructions within the scope of the claims and I wish it to be understood that the particular form shown is but one of the many forms. Various modifications and changes being possible, I do not otherwise limit myself in any way with respect thereto.

What is claimed is:

1. In combination, a reservoir adapted to contain liquid, a normally open inlet valve to admit liquid, liquid level responsive mechanism for normally closing the valve when the liquid reaches a predetermined height, the mechanism including a float having an open top so that on continued leakage of the valve liquid may overflow into the float, a second vertically movable float having a normal lower position in which it is received in the first float when the latter is in its upper position and adapted to be partially immersed in the liquid overflowing into the first float whereby the said second float is buoyed upwardly, a weight normally held in its upper position when the second float is in its normal position and released when the second float rises so that it drops, and a valve closing element engageable by the weight.

2. The combination as claimed in claim 1, wherein the support for the second float includes a latch which supports the weight.

3. The combination as claimed in claim 1, wherein the second float is dome shaped and open at the bottom so that air is trapped therein by the liquid in the first float.

4. The combination as claimed in claim 1, wherein the walls of the floats are closely spaced so that overflowing liquid produces a buoyancy in the second float to release the weight before the first float is filled sufficiently to lose its buoyancy and sink.

RALPH W. DE LANCEY.